(12) United States Patent
Berry, Jr. et al.

(10) Patent No.: US 8,230,495 B2
(45) Date of Patent: Jul. 24, 2012

(54) METHOD FOR SECURITY IN ELECTRONICALLY FUSED ENCRYPTION KEYS

(75) Inventors: Robert W. Berry, Jr., Round Rock, TX (US); Jonathan J. DeMent, Austin, TX (US); John S. Liberty, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/413,016

(22) Filed: Mar. 27, 2009

(65) Prior Publication Data
US 2010/0250943 A1    Sep. 30, 2010

(51) Int. Cl.
*G06F 21/00* (2006.01)
(52) U.S. Cl. ......................................................... 726/16
(58) Field of Classification Search .................. None
See application file for complete search history.

(56) References Cited

U.S. PATENT DOCUMENTS

| | | | |
|---|---|---|---|
| 5,033,084 A * | 7/1991 | Beecher ......................... | 705/56 |
| 5,452,355 A | 9/1995 | Coli | |
| 5,563,950 A * | 10/1996 | Easter et al. .................. | 713/191 |
| 5,799,080 A | 8/1998 | Padmanabhan et al. | |
| 6,292,422 B1 * | 9/2001 | Pitts ........................... | 365/225.7 |
| 6,505,324 B1 * | 1/2003 | Cowan et al. ................. | 716/100 |
| 6,915,476 B2 * | 7/2005 | Morino et al. ................ | 714/768 |
| 7,076,699 B1 * | 7/2006 | Puri et al. ..................... | 714/710 |
| 7,120,696 B1 | 10/2006 | Au et al. | |
| 7,268,577 B2 | 9/2007 | Erickson et al. | |
| 7,336,095 B2 * | 2/2008 | Erickson et al. ............. | 326/8 |
| 7,821,041 B2 * | 10/2010 | Chung et al. .................. | 257/209 |
| 7,941,769 B1 * | 5/2011 | Hu ................................. | 716/101 |
| 2005/0122800 A1 * | 6/2005 | Morino et al. ................ | 365/200 |
| 2005/0212527 A1 * | 9/2005 | Wu ................................ | 324/550 |
| 2006/0025952 A1 | 2/2006 | Buhr | |
| 2006/0131743 A1 * | 6/2006 | Erickson et al. ............. | 257/737 |
| 2006/0136751 A1 * | 6/2006 | Bonaccio et al. ............. | 713/194 |

(Continued)

FOREIGN PATENT DOCUMENTS

JP    1003-046501    2/2003

OTHER PUBLICATIONS

Tom Kean, Cryptographic Rights Management of FPGA Intellectual Property Cores, Feb. 2002, Published in: US.
G. Edward Suh, et al., Physical Unclonable Functions for Device Authentication and Secret Key Generation, Jun. 2007, Published in: US.
Thomas Wollinger, et al., Security on FPGAs: State-of-the-Art Implementations and Attacks, ACM Transactions on Embedded Computing Systems, Aug. 2004, pp. 534-574, vol. 3, No. 3, Publisher: ACM, Inc., Published in: US.

*Primary Examiner* — Oscar Louie
(74) *Attorney, Agent, or Firm* — Suiter Swantz pc llo

(57) ABSTRACT

A method for electronically fused encryption key security includes inserting a plurality of inverters between a bank of security fuses and a fuse sense logic module. The method also includes sensing an activated set of the bank of security fuses and the plurality of inverters. The method further includes comparing the sensed activated set of the bank of security fuses and the plurality of inverters with a software key to determine whether at least a substantial match is made.

17 Claims, 9 Drawing Sheets

U.S. PATENT DOCUMENTS

| | | | |
|---|---|---|---|
| 2006/0136858 A1* | 6/2006 | Erickson et al. | 716/17 |
| 2007/0241768 A1* | 10/2007 | Erickson et al. | 326/8 |
| 2008/0283963 A1* | 11/2008 | Chung et al. | 257/529 |
| 2009/0080659 A1* | 3/2009 | Elder et al. | 380/278 |
| 2009/0290712 A1* | 11/2009 | Henry et al. | 380/277 |
| 2009/0292929 A1* | 11/2009 | Henry et al. | 713/189 |
| 2009/0292931 A1* | 11/2009 | Henry et al. | 713/190 |
| 2009/0293129 A1* | 11/2009 | Henry et al. | 726/26 |
| 2009/0293130 A1* | 11/2009 | Henry et al. | 726/26 |
| 2009/0293132 A1* | 11/2009 | Henry et al. | 726/27 |
| 2010/0085075 A1* | 4/2010 | Luzzi et al. | 326/8 |
| 2010/0264932 A1* | 10/2010 | Marinissen et al. | 324/537 |

* cited by examiner

METHOD FOR SECURITY IN ELECTRONICALLY FUSED ENCRYPTION KEYS

TECHNICAL FIELD

The present disclosure relates to a method and system for improving security in electronically fused encryption keys.

BACKGROUND

Semiconductor devices may utilize security keys to protect against unauthorized access. The semiconductor industry is making use of electronic fuses that may be blown in a manufacturing environment which may allow unique data to be stored permanently on a per processor basis. Electronic fuses are typically sensed electronically during power-on or each time the data is read. Unauthorized users (e.g., a user without a matching key to an encryption key) may attempt to work around these security schemes by using unnatural voltages, voltage sequences, temperature, and frequency. For instance, an unauthorized user may attempt to lower the voltage and cool the processor during a boot sequence in an effort to malfunction the electronic fuses into a known state—such as all zero or all one—which may be trivial to bypass.

SUMMARY

A method for electronically fused encryption key security includes inserting a plurality of inverters between a bank of security fuses and a fuse sense logic module. The method also includes sensing an activated set of the bank of security fuses and the plurality of inverters. The method further includes comparing the sensed activated set of the bank of security fuses and the plurality of inverters with a software key to determine whether at least a substantial match is made.

An electronically fused encryption key security system includes a plurality of security fuses and a plurality of inverters operably coupled between the plurality of security fuses and a fuse sense logic module. The fuse sense logic module is configured for sensing the output of the plurality of security fuses and the plurality of inverters. The system also includes a software key including a preconfigured fuse sense pattern and a comparison module configured to compare the output of the fuse sense logic module and the software key.

An electronically fused encryption key security system includes a plurality of security fuses and an error correction code (ECC) check module operably coupled between the plurality of security fuses and a fuse sense logic module. The fuse sense logic module is configured for sensing the output of the ECC check module. The system also includes a plurality of ECC fuses operably coupled to the ECC check module. The ECC check module is configured to compare an output from the plurality of security fuses and an output from the plurality of ECC fuses to determine whether at least a substantial match is made. The system further includes a software key including a preconfigured fuse sense pattern and a comparison module configured to compare the output of the fuse sense logic module and the software key.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
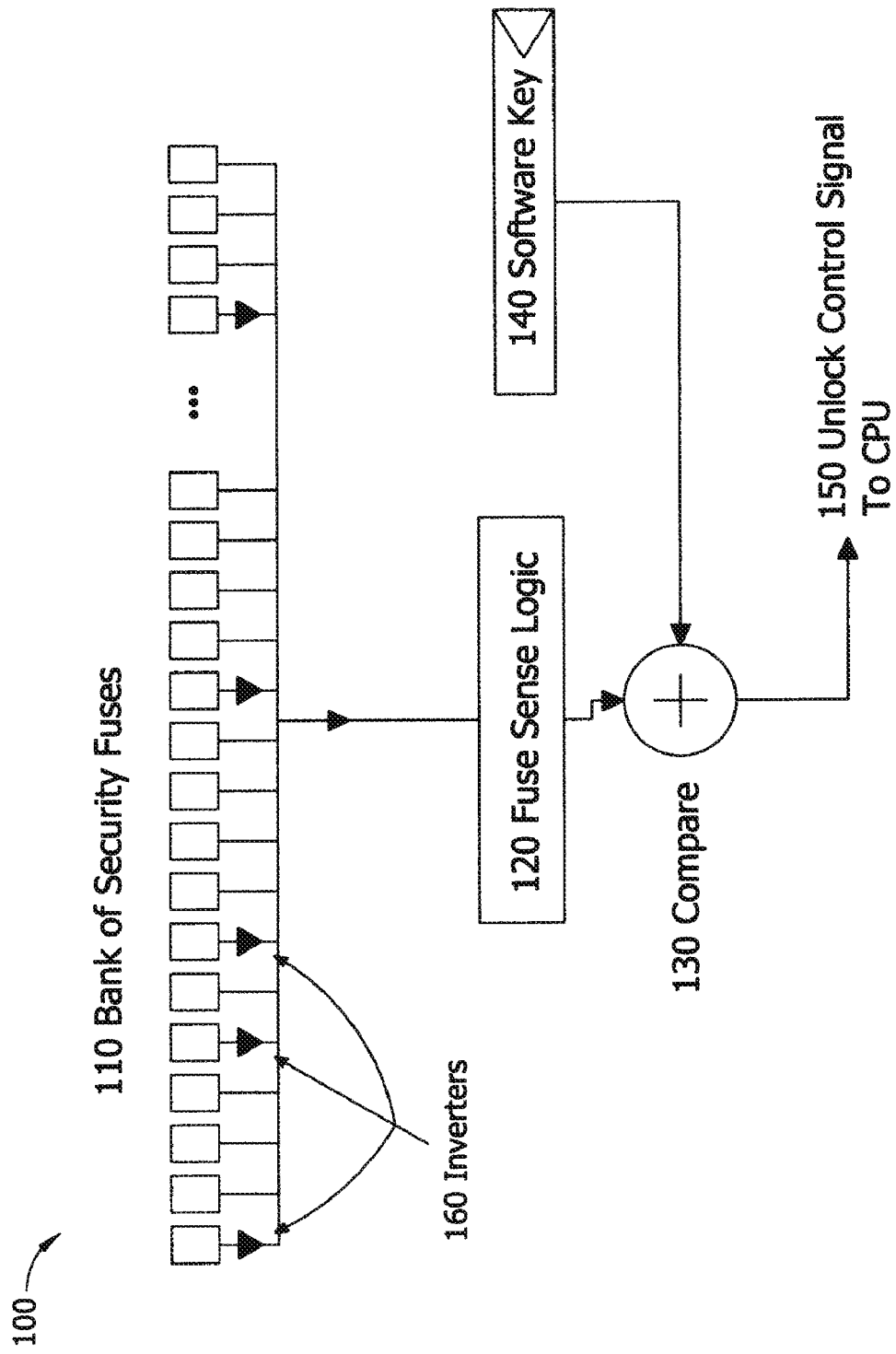
FIG. 1 is a block diagram illustrating an embodiment of an electronically fused encryption key security system.

Referring to FIG. 1, a block diagram illustrating an embodiment of an electronically fused encryption key security system 100 is displayed. The system 100 may include a bank of security fuses 110. For instance, the bank of security fuses 110 may include a plurality of security fuses which may be utilized to create an encryption key to protect a device or information on a device from unauthorized use by requiring a user to have a matching key to unlock the device or data. In one embodiment, the bank of security fuses 110 includes electronic fuses blown in a manufacturing environment to allow data to be stored on a per processor basis, such as in a permanent state via a laser or other commonly understood method in the art. Increasing the number of fuses in the bank of security fuses 110 may allow for an increased protection level, such as on an exponential scale, by adding additional bits to the encryption key. The increased bits on the encryption key thereby increases the number of possible keys, of which only one key may be valid.

The system 100 may also include a fuse sense logic module 120. Fuse sense logic module 120 may be implemented to sense an activated set of the bank of security fuses 110, such as by receiving an output signal from the bank of security fuses 110. For instance, when a user attempts to access system 100, an output from the bank of security fuses 110 may be sent to the fuse sense logic module 120 for processing, such as via an output signal. Fuse sense logic module 120 may be configured to compare 130 the output of the bank of security fuses 110 to a software key 140. For example, fuse sense logic module 120 may be configured to control a comparison module 130, or alternatively, fuse sense logic module 120 may include a comparison module 130 which may include hardware and/or software configured to support a comparison to be made. Such hardware and/or software may be of a form known in the art.

Software key 140 may include a preconfigured fuse sense pattern, which may provide a key against which the output of the bank of security fuses 110 may be compared. In one embodiment, the software key 140 is stored in a register of system 100. For instance, the software key 140 may be stored in a memory system within system 100, such as in a nonvolatile memory component including one or more of ROM (read only memory), PROM (programmable ROM), EPROM (erasable PROM), EEPROM (electronically erasable PROM), flash memory, or other suitable memory technology. Alternatively, the software key 140 may be supplied to system 100 via an external memory device, such as a hard disc drive, an optical disc, a flash memory device, or other suitable portable memory device.

As explained above, fuse sense logic module 120 may be configured to compare 130 the output of the bank of security fuses 110 to a software key 140. In one embodiment, the comparison is made to determine whether at least a substantial match is made. For instance, at least a substantial match may include a majority of the bits of the output of the bank of security fuses 110 matching the bits of the software key, or may include a range of percentiles that indicate a substantial match, such as between 60 and 95%, or the like. However, it may be appreciated that any degree of specificity may be made in determining whether a match is made, including requiring an exact match, wherein the output of the bank of security fuses 110 exactly matches the software key (e.g., the bits of the output of the bank of security fuses 110 exactly matches the bits of the software key). When the fuse sense logic module 120 determines the requisite degree of comparison has been established, the fuse sense logic module 120 may send an unlock control signal 150 to a CPU, computer/device hardware, or the like, which may enable the device or information on the device to be accessed. As will be explained below, a number of techniques may be utilized to help ensure that the device or information on the device will be accessed by a user with the proper authentication key, as opposed to an unauthorized user using bypassing techniques.

The system 100 may include a plurality of inverters 160 to invert the output of selected fuses of the bank of security fuses 110. The plurality of inverters 160 may be operably coupled between the bank of security fuses 110 and the fuse sense logic module 120. In one embodiment, the plurality of inverters 160 may be included in a pseudo-random arrangement between the bank of security fuses 110 and the fuse sense logic module 120. For instance, a pseudo-random arrangement of fuses of the bank of security fuses 110 may have outputs inverted before the output signals are sent to the fuse sense logic module 120. In this manner, the key formed by the bank of security fuses 110 may be made less trivial, even if all the fuses are sensed the same. For example, even if an unauthorized user employed techniques such as utilizing unnatural voltages, voltage sequences, temperatures, and frequencies, and the like to attempt to have all the fuses sensed as an unintended, predictable pattern, the inverters may prevent such techniques from providing a substantial match between the output of the bank of security fuses 110 and the software key 140. In this manner, the inverters may prevent a trivial pattern of all zeroes or all ones from reaching the fuse sense logic module 120 for comparison 130 for which an unauthorized user could provide the corresponding all zero or all one software key. It may be appreciated that any number of inverters may be utilized to provide a desired inversion effect on the outputs of fuses from the bank of security fuses, and that such inverters may be utilized as part of a pattern or as a random or pseudo-random arrangement.

The plurality of inverters 160 may be accounted for during the time of manufacturing, such as when setting the encryption key to be matched in the software key 140. For bit positions where there is an inverter, the key may be stored as inverted in the e-fuse of the bank of security fuses 110. In this manner, an authorized user providing a software key 140 may not need to know about the inversion that occurs in the hardware to obscure the key.

Figure 2:
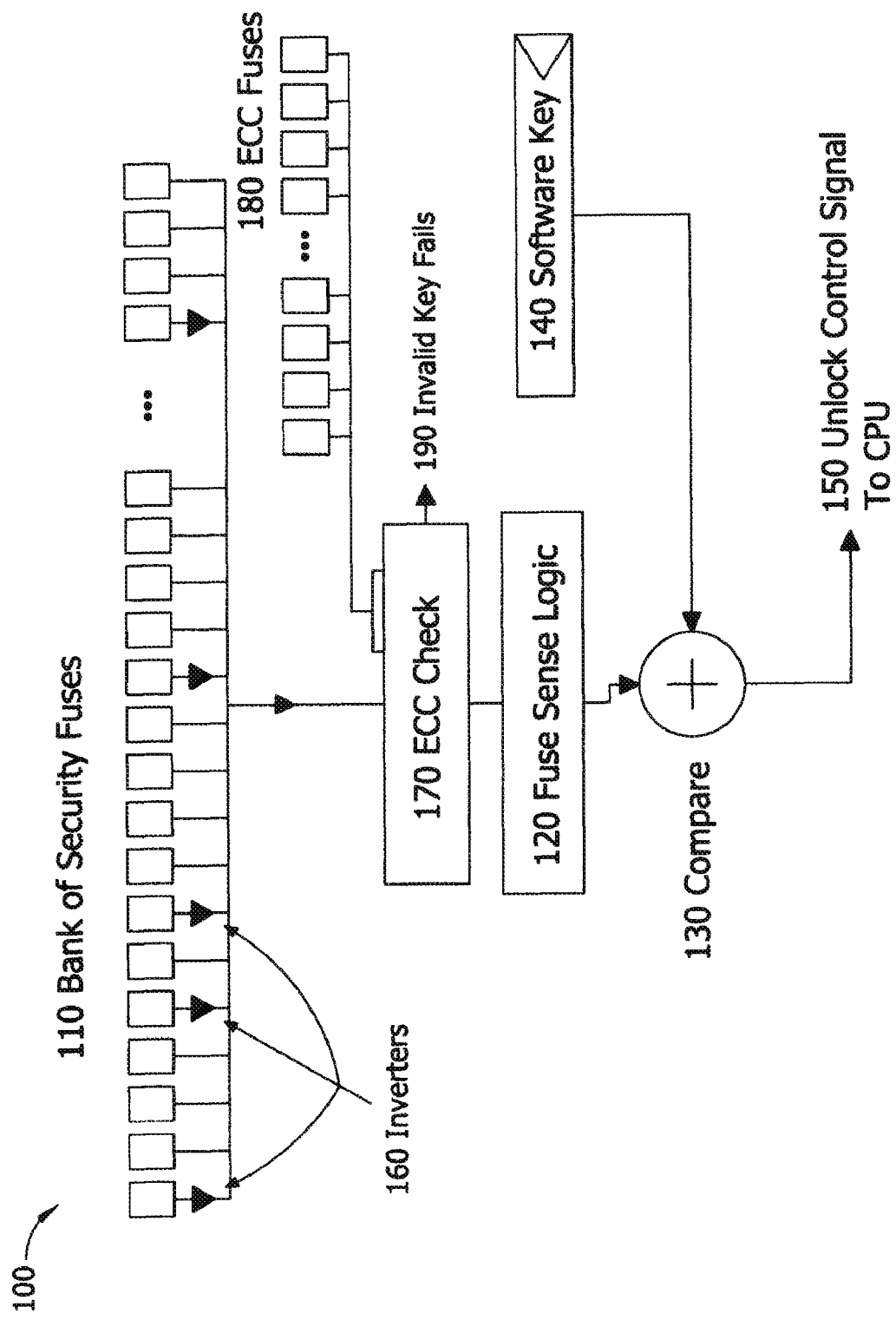
FIG. 2 is a block diagram illustrating another embodiment of an electronically fused encryption key security system.

Referring now to FIG. 2, a block diagram illustrating another embodiment of an electronically fused encryption key security system 100 is displayed. System 100 may include an error correction code (ECC) check module 170 and a plurality of ECC fuses 180. The ECC check module 170 may be operably coupled between the bank of security fuses 110 and the fuse sense logic module 120. The plurality of ECC fuses 180 may be operably coupled to the ECC check module 170.

The ECC check module 170 may be configured to compare an output from the bank of security fuses 110 and the plurality of inverters 160 and an output from the plurality of ECC fuses 180 to determine whether at least a substantial match is made. For instance, the plurality of ECC fuses 180 may include a plurality of check-bits against which an output from the bank of security fuses 110 may be compared to determine whether the activated set of the bank of security fuses 110 is a valid key. When the result of comparing an output from the bank of security fuses 110 and the plurality of inverters 160 and an output from the plurality of ECC fuses 180 is determined to not be at least a substantial match, the activated set of the bank of security fuses may be rejected 190 by the ECC check module 170. Thus, the attempted key may be deemed invalid 190, and may fail even before the fuse sense logic module 120 compares the attempted key to the software key 140. In such an instance, no unlock signal 150 would be sent to a CPU, computer/device hardware, or the like, thereby keeping the device or information on the device locked/restricted.

When an attempted key is deemed valid by the ECC check module 170, the fuse sense logic module 120 may then compare 130 the output of the bank of security fuses 110 to a software key 140. When the fuse sense logic module 120 determines the requisite degree of comparison has been established, the fuse sense logic module 120 may send an unlock control signal 150 to a CPU, computer/device hardware, or the like, which may enable the device or information on the device to be accessed.

Additionally, it may be appreciated that the system 100 may be implemented without the plurality of inverters 160, and instead the system may rely on ECC check module 170 and the plurality of ECC fuses 180 to avoid access to a device or information on a device by an unauthorized user.

Figure 3:
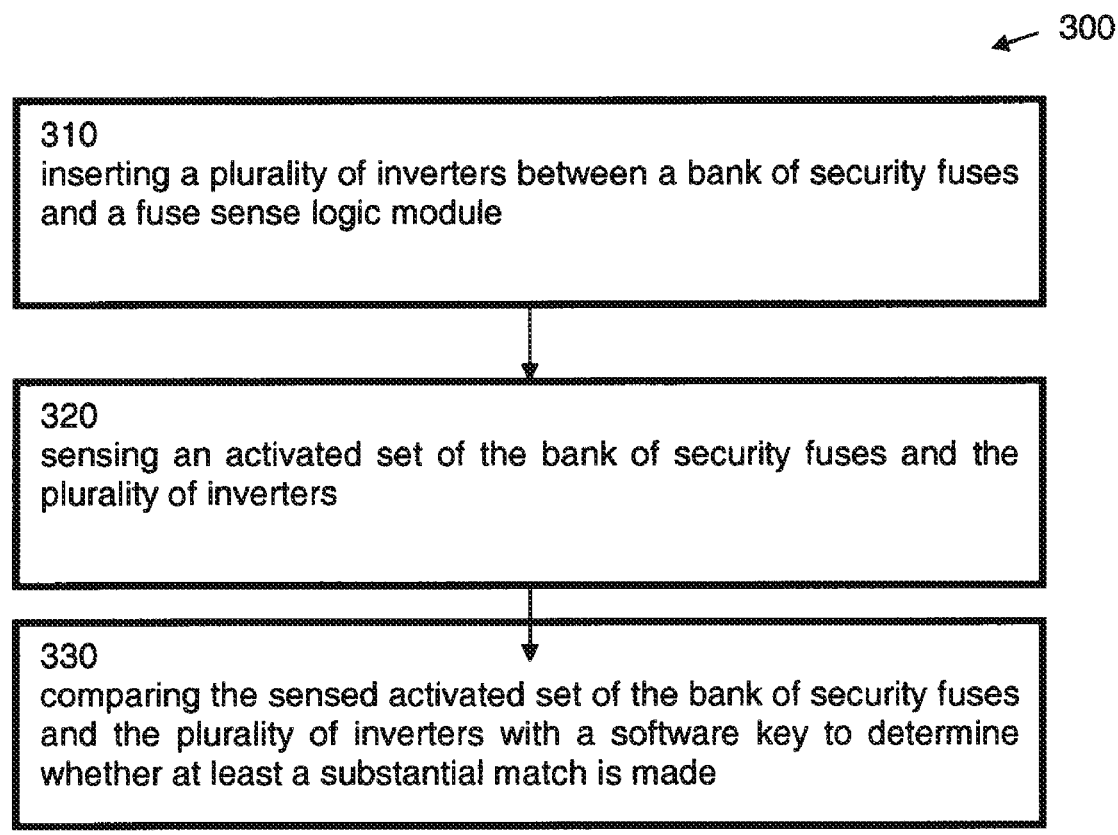
FIG. 3 is a flow chart illustrating a method for electronically fused encryption key security.

Referring now to FIG. 3, a flow chart illustrating an example operation flow 300 for electronically fused encryption key security is displayed. In FIG. 3 and in following figures that include various examples of flows charts, discussion and explanation may be provided with respect to the above-described examples of FIGS. 1 and 2, and/or with respect to other examples and contexts. However, it should be understood that the flow charts may be executed in a number of other environments and contexts, and/or in modified versions of FIGS. 1 and 2. Also, although the various flows are presented in the sequence(s) illustrated, it should be understood that the various operations may be performed in other orders than those which are illustrated, or may be performed concurrently.

Operation 310 depicts inserting a plurality of inverters between a bank of security fuses and a fuse sense logic module. For example, as shown in FIGS. 1 and 2, the plurality of inverters 160 may be operably coupled on a plurality of fuses of the bank of security fuses 110, which may prevent the forcing of all fuses to result in a predictable value. Then, operation 320 depicts sensing an activated set of the bank of security fuses and the plurality of inverters. For example, as shown in FIGS. 1 and 2, an activated set of the bank of security fuses and the plurality of inverters may be sensed or detected by the fuse sense logic module 120 and/or by the ECC check module 170.

Operation 330 depicts comparing the sensed activated set of the bank of security fuses and the plurality of inverters with a software key to determine whether at least a substantial match is made. For example, as shown in FIGS. 1 and 2, the fuse sense logic module 110 may compare the sensed activated set of the bank of security fuses and the plurality of inverters with a software key to determine whether at least a substantial match is made.

Figure 4:
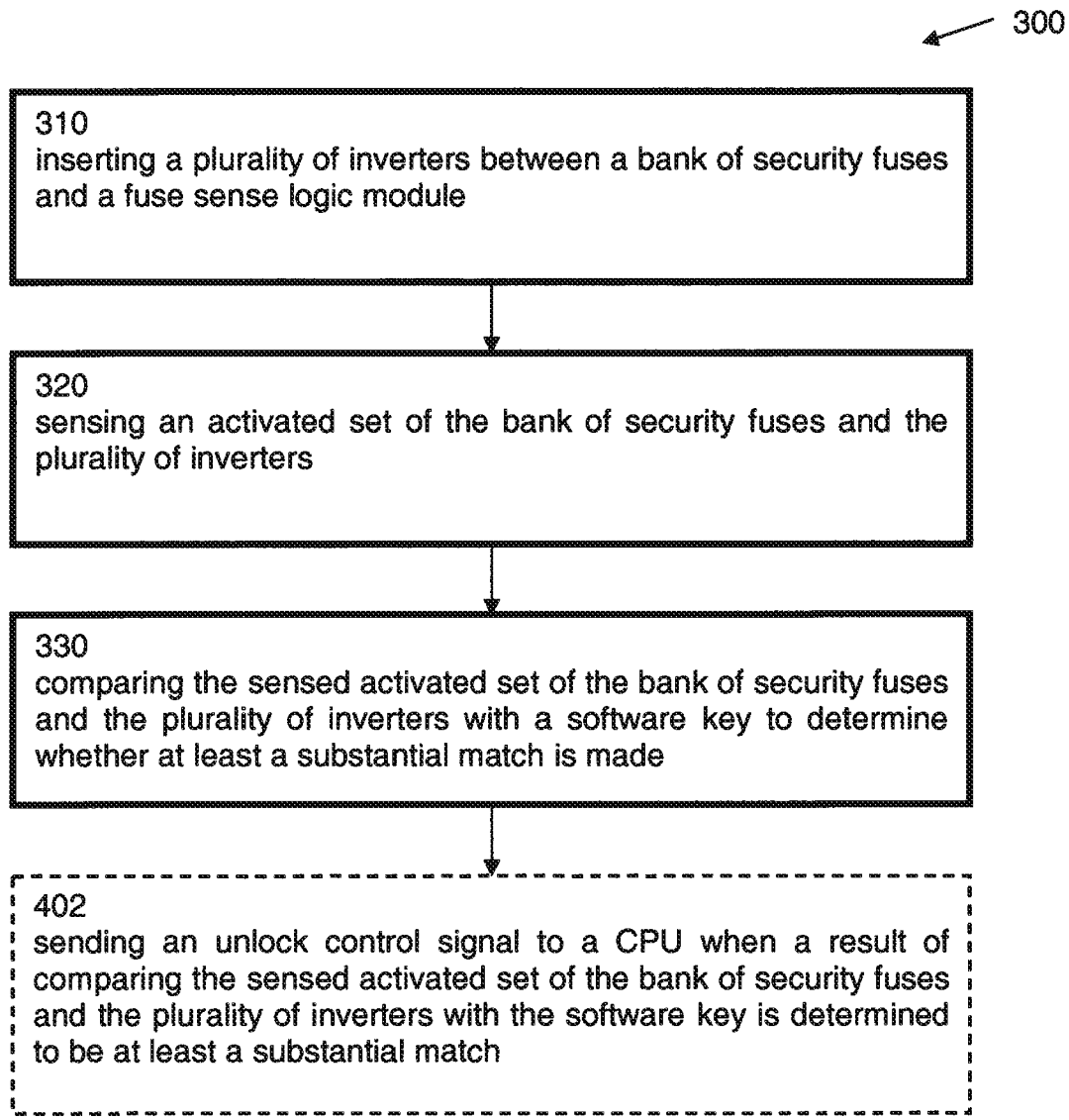
FIG. 4 illustrates an alternative embodiment of the flow chart of FIG. 3.

FIG. 4 illustrates an alternative embodiment of the flow chart of FIG. 3. FIG. 4 illustrates an example embodiment where the example operational flow 300 of FIG. 3 may include at least one additional operation. An additional operation may include operation 402. After operation 310, operation 320, and operation 330, the operational flow 300 moves to an operation 402. Operation 402 illustrates sending an unlock control signal to a CPU when the result of comparing the sensed activated set of the bank of security fuses and the plurality of inverters with the software key is determined to be at least a substantial match. For example, as shown in FIGS. 1 and 2, an unlock control signal 150 may be sent after the fuse sense logic module 120 and/or a comparison module compares 130 the sensed activated set of the bank of security fuses and the plurality of inverters with the software key and determines at least a substantial match is present.

Figure 5:
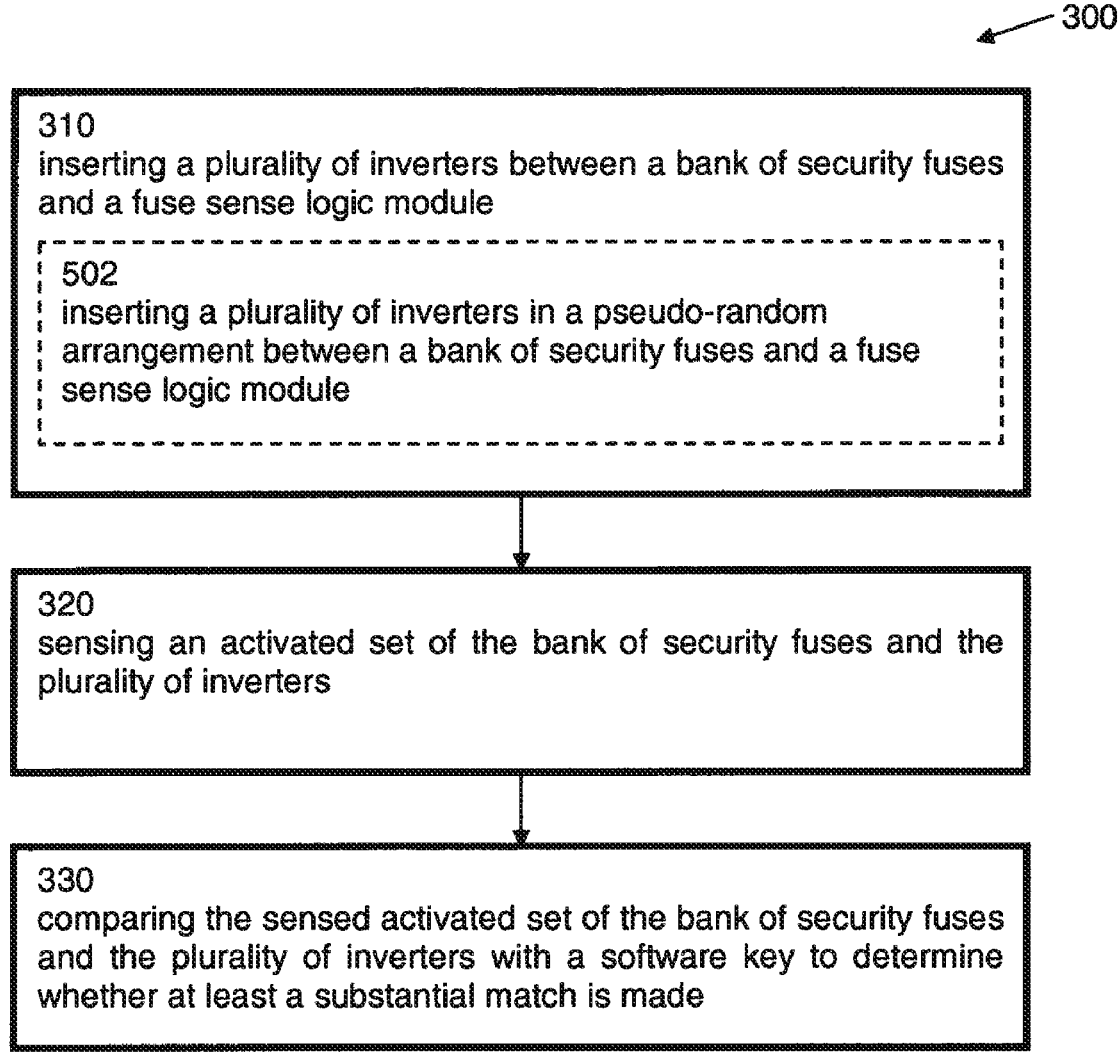
FIG. 5 illustrates an alternative embodiment of the flow chart of FIG. 3.

FIG. 5 illustrates an alternative embodiment of the example operation flow 300 of FIG. 3. FIG. 5 illustrates an example embodiment where the operation 310 may include at least one additional operation. The at least one additional operation may include operation 502. Operation 502 illustrates inserting a plurality of inverters in a pseudo-random arrangement between a bank of security fuses and a fuse sense logic module. For example, as shown in FIGS. 1 and 2, a plurality of inverters 160 may be operably coupled in a pseudo-random arrangement after a plurality of fuses of the bank of security fuses 110.

Figure 6:
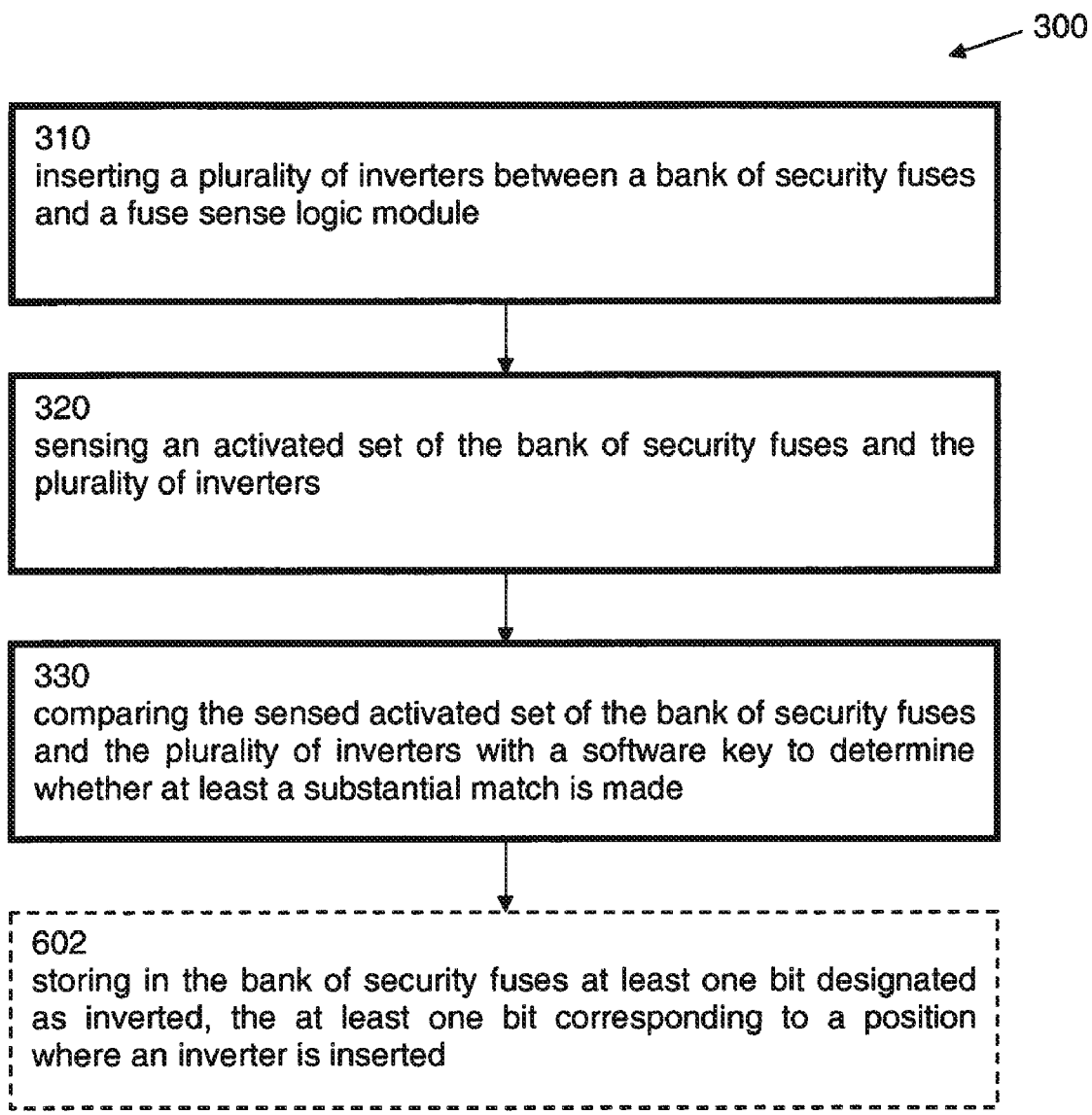
FIG. 6 illustrates an alternative embodiment of the flow chart of FIG. 3.

FIG. 6 illustrates an alternative embodiment of the flow chart of FIG. 3. FIG. 6 illustrates an example embodiment where the example operational flow 300 of FIG. 3 may include at least one additional operation. An additional operation may include operation 602. After operation 310, operation 320, and operation 330, the operational flow 300 moves to an operation 602. Operation 602 illustrates storing in the bank of security fuses at least one bit designated as inverted, the at least one bit corresponding to a position where an inverter is inserted. As explained before, the plurality of inverters 160 may be accounted for during the time of manufacturing, such as when setting the encryption key to be matched in the software key 140. For bit positions where there is an inverter, the key may be stored as inverted in the e-fuse of the bank of security fuses 110.

Figure 7:
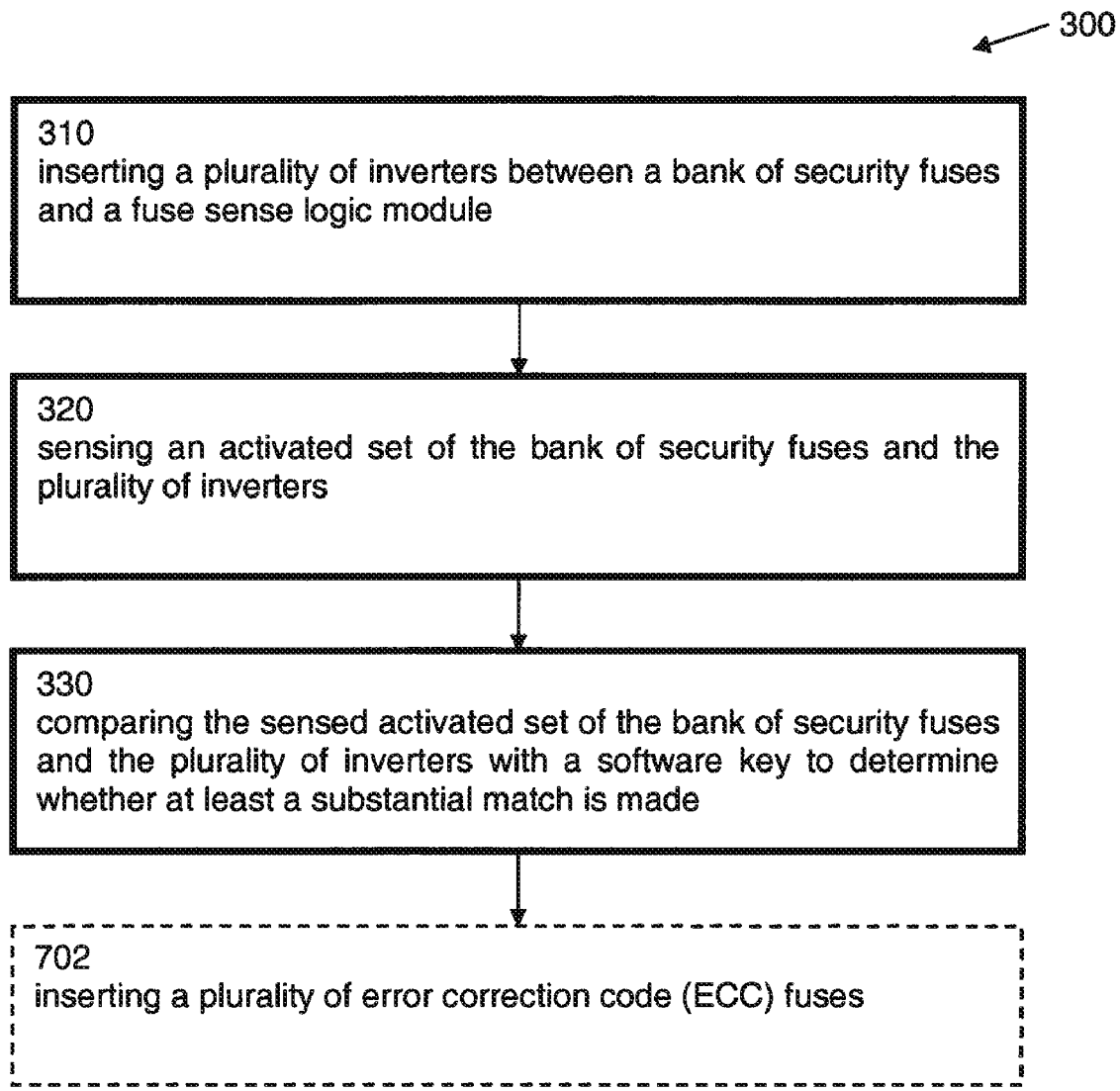
FIG. 7 illustrates an alternative embodiment of the flow chart of FIG. 3.

FIG. 7 illustrates an alternative embodiment of the flow chart of FIG. 3. FIG. 7 illustrates an example embodiment where the example operational flow 300 of FIG. 3 may include at least one additional operation. An additional operation may include operation 702. After operation 310, operation 320, and operation 330, the operational flow 300 moves to an operation 702. Operation 702 illustrates inserting a plurality of error correction code (ECC) fuses. For example, as shown in FIG. 2, a plurality of ECC fuses 180 may be inserted into system 100, and may be operably coupled to ECC check module 170.

Figure 8:
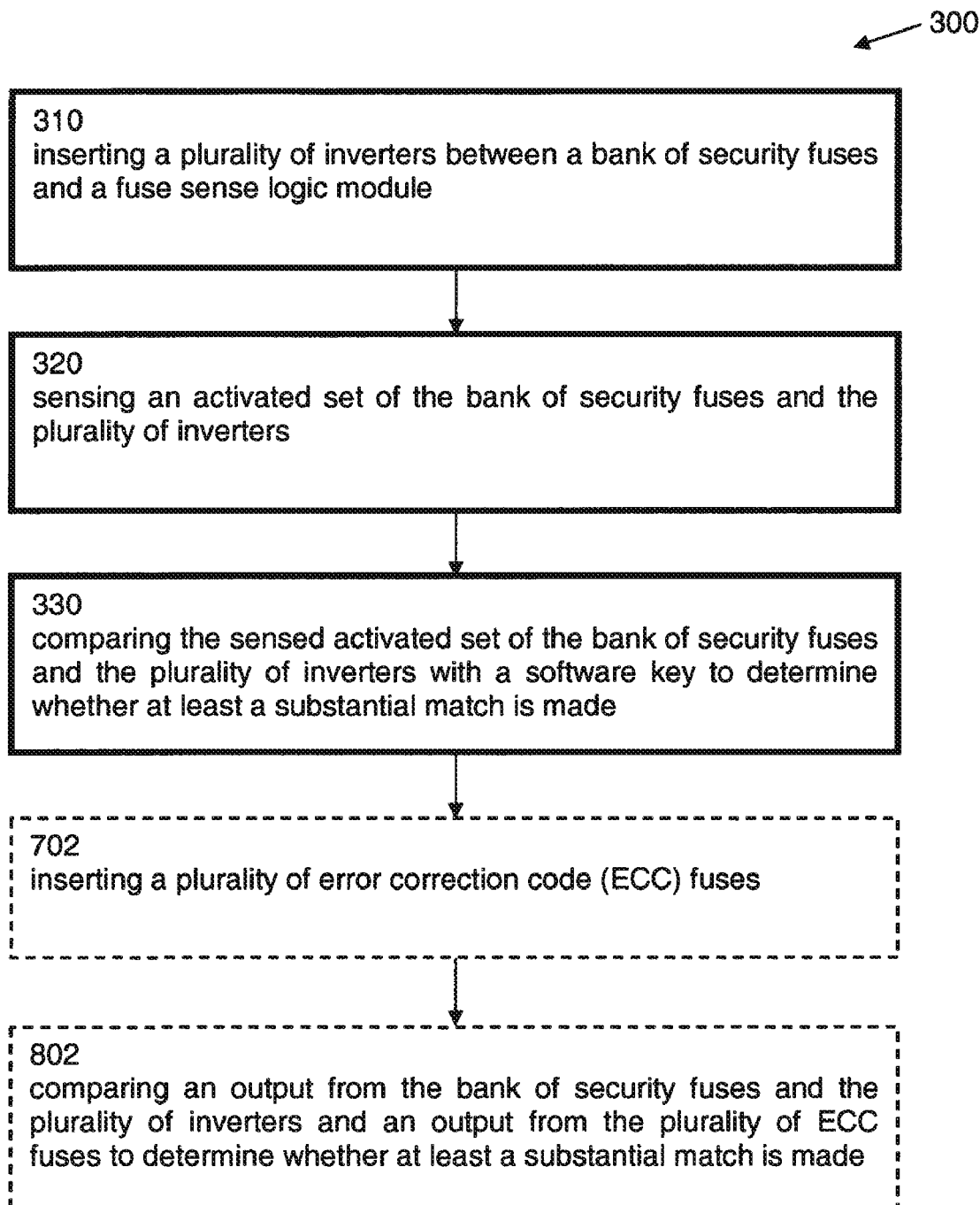
FIG. 8 illustrates an alternative embodiment of the flow chart of FIG. 3.

FIG. 8 illustrates an alternative embodiment of the flow chart of FIG. 3. FIG. 8 illustrates an example embodiment where the example operational flow 300 of FIG. 7 may include at least one additional operation. An additional operation may include operation 802. After operation 310, operation 320, operation 330, and operation 702, the operational flow 300 moves to an operation 802. Operation 802 illustrates comparing an output from the bank of security fuses and the plurality of inverters and an output from the plurality of ECC fuses to determine whether at least a substantial match is made. For example, as shown in FIG. 2, the ECC check module 170 may compare an output from the bank of security fuses 110 and the plurality of inverters 160 and an output from the plurality of ECC fuses 180 to determine whether at least a substantial match is made.

Figure 9:
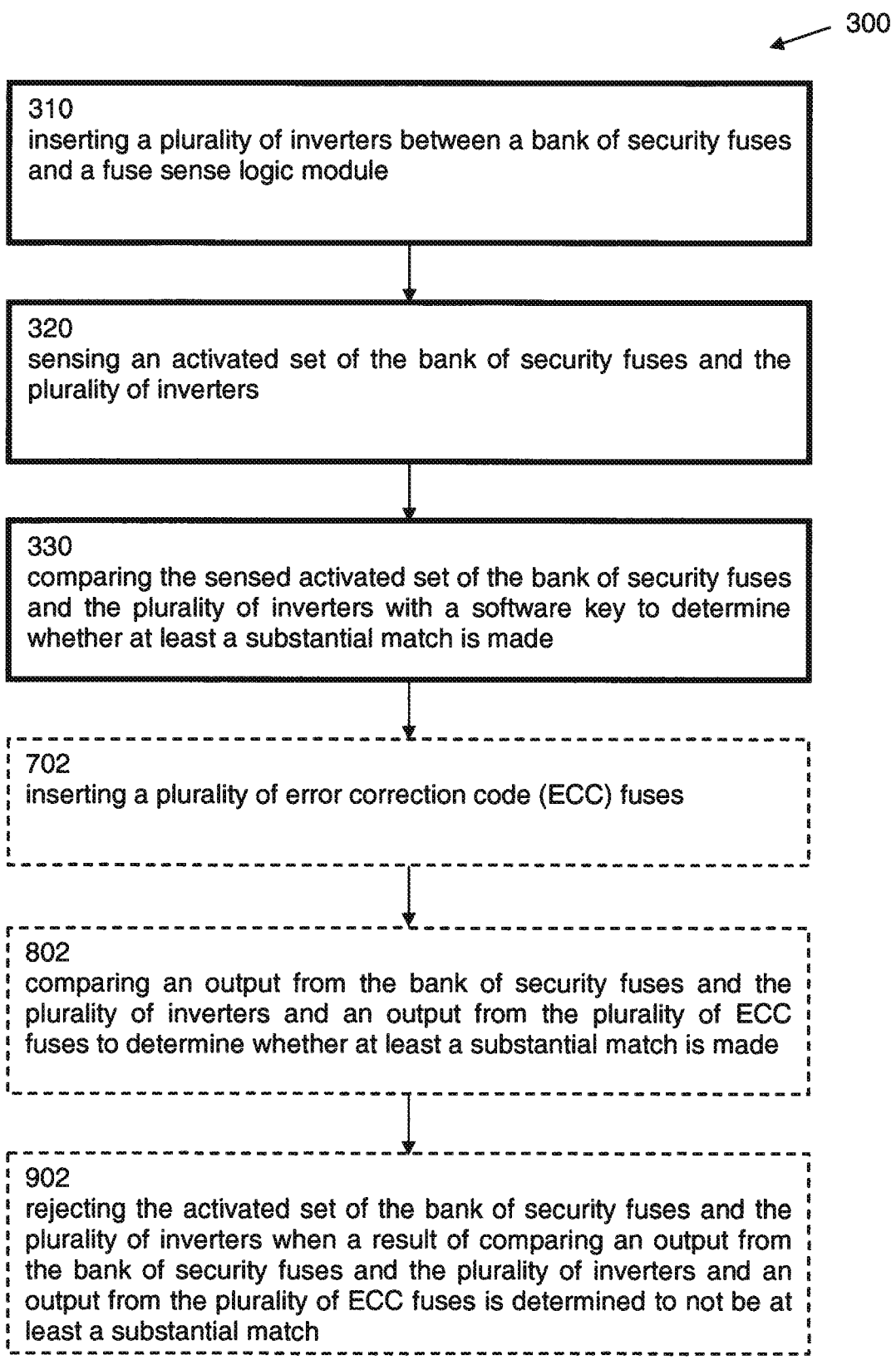
FIG. 9 illustrates an alternative embodiment of the flow chart of FIG. 3.

FIG. 9 illustrates an alternative embodiment of the flow chart of FIG. 3. FIG. 9 illustrates an example embodiment where the example operational flow 300 of FIG. 8 may include at least one additional operation. An additional operation may include operation 902. After operation 310, operation 320, operation 330, operation 702, and operation 802, the operational flow 300 moves to an operation 902. Operation 902 illustrates rejecting the activated set of the bank of security fuses and the plurality of inverters when the result of comparing an output from the bank of security fuses and the plurality of inverters and an output from the plurality of ECC fuses is determined to not be at least a substantial match. For example, in FIG. 2, an invalid key fails 190 when the ECC check module 170 determines that an output from the bank of security fuses 110 and the plurality of inverters 160 and an output from the plurality of ECC fuses 180 are not at least a substantial match.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing security in an electronically fused key system, the method comprising:
   receiving an output of a bank of security fuses and a plurality of inverters;
   comparing the received output of the bank of security fuses and the plurality of inverters with a software key, the software key including a preconfigured fuse sense pattern;
   determining whether the preconfigured fuse sense pattern of the software key at least substantially matches said output of the bank of security fuses and the plurality of inverters; and
   sending an unlock control signal configured to unlock a CPU when the preconfigured fuse sense pattern of the software key at least substantially matches said output of the bank of security fuses and the plurality of inverters.

2. The method of claim 1, wherein the plurality of inverters are coupled between the bank of security fuses and a fuse sense logic module in a pseudo-random arrangement.

3. The method of claim 1, further including:
storing in the bank of security fuses at least one bit designated as inverted, the at least one bit corresponding to a position where an inverter is inserted.

4. The method of claim 1, wherein the electronically fused key system includes a plurality of error correction code (ECC) fuses.

5. The method of claim 4, further including:
comparing the output from the bank of security fuses and the plurality of inverters and an output from the plurality of ECC fuses; and
determining whether the output from the bank of security fuses and the plurality of inverters at least substantially matches the output from the plurality of ECC fuses.

6. The method of claim 5, further including:
rejecting the output of the bank of security fuses and the plurality of inverters when the output from the bank of security fuses and the plurality of inverters fails to at least substantially match the output from the plurality of ECC fuses.

7. An electronically fused encryption key security system, comprising:
a plurality of security fuses;
a plurality of inverters coupled between the plurality of security fuses and a fuse sense logic module;
the fuse sense logic module configured for receiving an output of the plurality of security fuses and the plurality of inverters;
a software key including a preconfigured fuse sense pattern; and
a comparison module, the comparison module configured for:
comparing the output of the plurality of security fuses and the plurality of inverters with the software key; and
determining whether the preconfigured fuse sense pattern of the software key at least substantially matches said output of the plurality of security fuses and the plurality of inverters; and
sending an unlock control signal to a CPU when the preconfigured fuse sense pattern at least substantially matches the output of the fuse sense logic module.

8. The system of claim 7, wherein the plurality of inverters are operably coupled in a pseudo-random arrangement between the plurality of security fuses and the fuse sense logic module.

9. The system of claim 7, further including:
an error correction code (ECC) check module operably coupled between the plurality of security fuses and the fuse sense logic module.

10. The system of claim 9, further including:
a plurality of ECC fuses operably coupled to the ECC check module, wherein the ECC check module is configured for:
comparing the output from the plurality of security fuses and the plurality of inverters and an output from the plurality of ECC fuses; and
determining whether the output from the plurality of security fuses and the plurality of inverters at least substantially matches the output from the plurality of ECC fuses.

11. The system of claim 10, wherein the ECC check module is further configured for rejecting the output from the plurality of security fuses and the plurality of inverters when the output from the plurality of security fuses and the plurality of inverters fails to at least substantially match the output from the plurality of ECC fuses.

12. The system of claim 7, further including:
a register for storing the software key.

13. An electronically fused encryption key security system, comprising:
a plurality of security fuses;
a plurality of ECC fuses operably coupled to an error correction code (ECC) check module;
the ECC check module coupled between the plurality of security fuses and a fuse sense logic module, wherein the ECC check module is configured for:
comparing an output from the plurality of security fuses and an output from the plurality of ECC fuses; and
determining whether the output from the plurality of security fuses at least substantially matches the output from the plurality of ECC fuses;
the fuse sense logic module, said fuse sense logic module configured for receiving the output of the ECC check module;
a software key including a preconfigured fuse sense pattern; and
a comparison module configured for:
comparing the output of the fuse sense logic module and the preconfigured fuse sense pattern of the software key;
determining whether the output from the fuse sense logic module at least substantially matches the preconfigured fuse sense pattern of the software key; and
sending an unlock control signal to a CPU when the preconfigured fuse sense pattern at least substantially matches the output of the fuse sense logic module.

14. The system of claim 13, wherein the ECC check module is further configured for rejecting an output from the plurality of security fuses when the output from the plurality of security fuses fails to at least substantially match the output from the plurality of ECC fuses.

15. The system of claim 13, further including:
a plurality of inverters operably coupled between the plurality of security fuses and the ECC check module,
wherein the fuse sense logic module is configured for receiving an output of the plurality of security fuses and the plurality of inverters.

16. The system of claim 15, wherein the plurality of inverters are operably coupled in a pseudo-random arrangement between the plurality of security fuses and the fuse sense logic module.

17. The system of claim 13, further including:
a register for storing the software key.

* * * * *